3,556,975
SELF-SUPPORTING CONSTRUCTION MATERIAL FOR THE MANUFACTURE OF CORROSION-RESISTANT PARTS OF APPARATUS IN CHEMICAL PLANTS, ESPECIALLY ELECTROLYSIS PLANTS
Karl Hass, Niederkassel, Walter Kolhagen, Cologne-Dellbruck, Gunther Czehovsky, Niederkassel, and Hans-Ewald Konermann, Troisdorf-Oberlar, Germany, assignors to Dynamit Nobel Aktiengesellschaft, Troisdorf, Bezirk Cologne, Germany, a corporation of Germany
No Drawing. Filed Apr. 26, 1967, Ser. No. 633,729
Int. Cl. B01k 3/10
U.S. Cl. 204—296     5 Claims

ABSTRACT OF THE DISCLOSURE

This specification describes a novel use for a particular chlorinated hydrocarbon polymer. The polymer has a hydrocarbon backbone with chlorine substituents thereon. The polymer can be manufactured by initially polymerizing vinyl chloride, ethylene, or 1,2-dichlorethylene alone or in combination with each other, and then post chlorinating the polymers to produce a chlorinated polymeric product having a chlorine content of about 60 to 73 weight percent arranged about 50 to 90% in a 1,2-dichloroethylene configuration. The product polymer is substantially insoluble in acetone and has a relative viscosity of about 1.3 to 25 when measured as a 0.5 weight percent solution in o-dichlorobenzene. These polymers have been found to be particularly well adapted to produce dimensionally stable, self-supporting, corrosion-resistant articles. These articles have found exceptional use in the manufacture of parts of apparatus used in a corrosive environment in chemical processes. Of special importance is the use of articles as described in electrolytic processes, particularly for chlorine production.

---

In the prior art, the attack of corrosive chemicals, especially under the additional stress of heat, has been combatted by the use of non-metallic materials such as ceramic, glass or plastics.

The advantages of the known materials consist mainly in the fact that ceramic material and glass are highly resistant to chemical attack, but they have relatively low resistance to fracture and to thermal shock. The plastics that have been used hitherto are more resistant to fracture than ceramic material and glass, but their use in chemical plants, especially in electrolysis plants, is greatly restricted by their poorer chemical resistance and their poorer stability of shape at elevated temperatures. An adequate thermal stability of shape and a chemical resistance that will assure dimensional stability and long life are indispensable requirements for use as a self-supporting construction material in permanent use in chemical plants, especially in electrolysis plants. Dimensional stability is especially necessary in the case of pipes, in which thermal expansion must be compensated by expansion joints and the like.

It is therefore an object of this invention to provide a novel polymeric material for use as structural elements in corrosive environments.

It is another object of this invention to utilize such polymer for production of self-supporting articles.

Other and additional objects of this invention will become apparent from a consideration of this entire specification, including the claims hereof.

In accordance with and fulfilling these objects, one aspect of this invention resides in the use of acetone-insoluble, chlorine-containing, highly polymeric hydrocarbons having a chlorine content of 60–73%, preferably 65–69%, which contain the chlorine arranged to 50–90%, preferably between 60–80%, in 1,2-dichlorethylene units, and have a relative viscosity, measured as an 0.5 weight-percent solution in o-dichlorobenzene at 85° C., of 1.3 to 25, as a self-supporting construction material for corrosion-endangered apparatus parts of chemical plants, especially electrolysis plants.

In the comparative testing of various plastics in practical use, it has been found that highly polymerized hydrocarbons that are especially insoluble in acetone, and have a chlorine content of 60 to 70%, and preferably between 65 and 69%, which contain 50 to 90%, and preferably between 60 and 80% of the chlorine in 1,2-dichlorethylene units, and whose relative viscosities, measured as a solution of 0.5 weight percent in o-dichlorobenzene at 85° C., range from 1.3 to 25, can be used advantageously as self-supporting construction material for the manufacture of corrosion-resistant and temperature-resistant apparatus parts in chemical plants, especially electrolysis plants, without any of the above-described disadvantages.

Highly polymerized hydrocarbons in the meaning of the present invention, having the stated chlorine content and the above-described chlorine distribution, are materials which are obtainable either through the homo-polymerization or co-polymerization of chlorine-containing monomers followed by postchlorination, or through the homopolymerization or co - polymerization of chlorine - free monomers with, if desired, chlorine-containing monomers and their postchlorination. Suitable monomers are 1,2-dichloroethylene, ethylene and vinyl chloride. The postchlorination of polyvinyl chloride or polyethylene can take place in aqueous suspension or in the dry state, but not in solution, since solution chlorination results in unstable chlorination products which are soluble in organic solvents, especially in acetone, and which have poor thermal stability of shape.

The advantages of the use of the described chlorine-containing polymers according to the invention lie in their good resistance to fracture, their excellent chemical resistance and their high thermal stability of shape. These characteristics make possible the extensive use of the described chlorine-containing polymers as a self-supporting construction material in chemical plants, especially electrolysis plants. The described material can be used to manufacture piping, tanks, blowers, reactors, etc. Additional advantages of the material used according to the invention as self-supporting construction material are good weldability and cementability, and the even afterwards still possible machinability. The construction material, according to the invention, may contain the manufacturing adjuvants customarily used in the manufacture of plastics.

The articles of this invention which serve as self-supporting construction materials can likewise be manufactured by prior-art methods of plastics manufacture. A number of characteristic values and examples of manufacturing additives are listed in the following table of examples of chlorine-containing, highly polymerized materials used according to the invention:

TABLE I

| Material | a | b | c | d | e |
|---|---|---|---|---|---|
| Basic material | (Polyvinyl chloride chlorinated in an aqueous suspension) | | | | |
| Chlorine content percent | 66.6 | 67.2 | 65.5 | 66.8 | 67.4 |
| Relative viscosity (measured in o-dichlorobenzene at 85° C. in the form of a solution of 0.5 weight percent) | 2.56 | 2.29 | 2.43 | 1.98 | 2.02 |
| Vicat stability of shape (° C.) | 122 | 124 | 120 | 118 | 120 |
| 1,2-dichloroethylene units (percent) measured by nuclear resonance | 66 | 69 | 72 | 70 | 67 |
| Stabilizer additive (barium calcium laurate (in percent by weight)) | 3 | 3 | 3 | 3 | 3 |
| Lubricant additive (calcium stearate (in percent by weight)) | 0.5 | 0.5 | 0.5 | 0.5 | 0.5 |
| E-Wachs* (in percent by weight) | 2 | 2 | 2 | 0.5 | 0.5 |
| Working temperature (° C.) | 195 | 195 | 195 | 185 | 210 |

*"E-Wachs" (commercial name) is a montanic acid esterified with 1,3-butylene glycol made by Gersthofen.

The application, according to the invention, of these chlorine-containing polymers that have been described is illustrated by the following examples:

EXAMPLE 1

A 40 x 3.4 mm. tube manufactured from polyvinyl chloride that has been postchlorinated in an aqueous suspension (Material a in Table 1) was exposed for six months to moist chlorine and to a chlorine-saturated sodium chloride solution at 80° C. A check on the tube dimensions showed no measurable changes. Furthermore, the chemically affected surface of the tube was cut away on a lathe in cuts of a depth of 0.1 mm. each, and the chlorine content of the individual layers was determined. The analysis values listed below surprisingly show no increase in the chlorine content of the outermost layer due to chemical modification:

Layer No. 1: 0.0 to 0.1 mm., 66.3% Cl
Layer No. 2: 0.1 to 0.2 mm., 66.2% Cl
Layer No. 3: 0.2 to 0.3 mm., 66.6% Cl
Layer No. 4: 0.3 to 0.4 mm., 66.6% Cl

EXAMPLE 2

A rubber-lined iron pipe having a nominal inside diameter of 250 (mm.) which was carrying moist chlorine and chlorine-saturated NaCl solution in an alkali-metal chloride electrolysis system was experimentally replaced by various plastic pipes. The rubber-lined iron pipes customarily used for the transportation of moist, chlorine-containing substances have the disadvantage that the rubber lining does not have a long-lasting chemical resistance and can pull away from the metal. Furthermore, iron pipes are subject to considerable corrosive attack on their exterior in chemical plants, and in alkali-metal chloride electrolysis systems, for example, they have to be electrically insulated from one another in sections. These disadvantages are entirely eliminated in the use of plastic pipes. Of the thermoplastics of the prior art, polyethylene and polyvinyl chloride are of no value for such applications on account of their poor stability of shape at elevated temperatures. For purposes of comparison, a commercially available polypropylene pipe material of identical size was used in addition to a 250 x 6.5 mm. pipe material manufactured from postchlorinated polyvinyl chloride (material b of Table I). After five months of continuous operation, the following observations were made:

TABLE II

| Material | Surface | Scaling | Tightness of Joints | |
|---|---|---|---|---|
| | | | Welded | Cemented |
| Polypropylene | Pitted | + | Not possible. | |
| Postchlorinated polyvinyl chloride | Smooth | None | + | + |

From the foregoing observations, it is apparent that, in contrast to polypropylene, postchlorinated polyvinyl chloride having the features of the invention is especially well suited for use as a self-supporting construction material for such chemically aggressive substances.

EXAMPLE 3

A polyvinyl chloride pipe measuring 63 x 20 mm., supported on angle-iron and serving for the transport of a 25% methanolic solution of potassium methylate at a temperature of 75° C. was replaced by a thin-walled 32 x 2.5 mm. pipe made of postchlorinated polyvinyl chloride (material c of Table I), without the use of any supporting structures. After 16 months of operation, no change of dimensions, nor any perceptible chemical attack could be found.

EXAMPLE 4

For experimental purposes, two storage apparatus were made; one of polypropylene, and one of postchlorinated polyvinyl chloride (material d of Table I), with the features of the invention, for the storage of extract fractions from an ion exchange system serving for the manufacture of concentrated potassium carbonate solutions. This storage apparatus consisted of a crown-shaped arrangement (outside diameter 3500 mm.) of 100 adjacent cells having a bottom area of about 100 x 100 mm. and a height of 300 mm. A pipe of similar material was put through the bottom plate and welded in a leak-proof manner to serve as a floor drain. This crown-shaped cell arrangement was set up on a rack-like support without any lateral supporting structures. After a short time of operation, the polypropylene crown of cells had undergone a deformation in the form of a flaring of the cell crown radius at the top edge in such a manner that, to secure the apparatus, the top outside edge of the crown had to be equipped with a ring made of angle iron and additional supporting means. The crown of cells made of postchlorinated polyvinyl chloride showed no deformation even after 12 months of operation.

EXAMPLE 5

An amalgam washing vat made of rubber-coated iron, which was being used in the electrolysis of alkali-metal chlorides, and through which amalgam and salt brine containing chlorine was passing at a temperature of 75° C., and which was serving for the precipitation of non-alkali amalgams, was replaced by a washing vat of the same size made of postchlorinated polyvinyl chloride (material e of Table I). The advantages of such construction over rubber-coated iron are more functional and lighter construction, no additional cost for electrical insulation since the material is self-insulating, and high resistance to internal and external corrosion.

EXAMPLE 6

A number of thermoplastics were subjected to a comparative stability test in a chlorine-saturated salt brine used in the electrolysis of alkali-metal chlorides, at a temperature of 80° C. After a test period of 30 days an evaluation of the 250 x 25 x 4 millimeter specimens (the specimens contained manufacturing additives like those of materials d and e of Table I and had been pressed at 195° C.) gave the following results:

TABLE III

| | Starting material | Chlorinated in | Percent Cl | $n_{rel}$ | Diss. in acetone | Surface |
|---|---|---|---|---|---|---|
| I | Chlorinated PVC | Aqueous suspension | 67.9 | 1.99 | − | Smooth. |
| II | Chlorinated polyethylene | ...do... | 64.6 | 2.51 | − | Do. |
| III | Chlorinated PVC | Tetrachloroethane solution | 64.0 | 2.20 | + | Uneven. |
| IV | Polypropylene | | | | − | Scaly. |
| V | Polyethylene | | | | − | Pitted. |

The above table shows that materials having the features described are especially well suited for use in chemical plants where they are exposed to corrosion and high temperatures.

What is claimed is:

1. Self-supporting corrosion-resistant parts of apparatus for chemical process equipment having as their chemical composition substantially acetone-insoluble chlorinated hydrocarbon polymers having a chlorine content of about 60 to 73 weight percent, a chlorine substitution of about 50 to 90% in the 1,2-dichloroethylene configuration and a relative viscosity, as measured in a 0.5 weight percent solution in o-dichlorobenzene at 85° C., of about 1.3 to 25.

2. Article as claimed in claim 1, having a chlorine content of about 65 to 69.

3. Article as claimed in claim 1, having its chlorine content arranged to the extent of about 60 to 80% in a 1,2-dichloroethylene configuration.

4. Article as claimed in claim 1 in the shape of a pipe.

5. Article as claimed in claim 1 in the shape of a storage tank.

References Cited

UNITED STATES PATENTS 3,257,334  6/1966  Chen et al. _____ 204—296X
3,361,660  1/1968  Chitten et al. _____ 204—297X

FOREIGN PATENTS 455,343  5/1950  Canada _____ 204—297
782,059  8/1957  Great Britain _____ 204—296

OTHER REFERENCES

Kainer: "Polyvinylchlorid und Vinylchlorid-Mischpolymerisate" (1951), Seite 125.

Chem. Zentralblattt 1952, Seite 1410 (Fr.Jjak): "Das nachchlorierte Polyvinylchlorid und seine Anwendung Als Schutzanstrich gegen starke Korrosive Einwirkungen."

PATRICK P. GARVIN, Primary Examiner

C. F. DEES, Assistant Examiner

U.S. Cl. X.R.

204—287, 297